US010504068B2

(12) United States Patent
Domnick et al.

(10) Patent No.: US 10,504,068 B2
(45) Date of Patent: Dec. 10, 2019

(54) DRIVER LOG ANALYTICS SYSTEM

(71) Applicant: OMNITRACS, LLC, Dallas, TX (US)

(72) Inventors: Lauren Domnick, Muskego, WI (US); Dean Croke, Acton, MA (US); Budi Tan, Atlanta, GA (US); Andrew Old, Marietta, GA (US); Patrick Ritto, Rancho Santa Fe, CA (US); Jeffrey Gilcrease, Acworth, GA (US)

(73) Assignee: OMNITRACS, LLC, Dallas, TX (US)

( * ) Notice: Subject to any disclaimer, the term of this patent is extended or adjusted under 35 U.S.C. 154(b) by 139 days.

(21) Appl. No.: 14/799,429

(22) Filed: Jul. 14, 2015

(65) Prior Publication Data

US 2017/0017927 A1  Jan. 19, 2017

(51) Int. Cl.
*G06F 15/02* (2006.01)
*G06Q 10/10* (2012.01)
*B60W 50/00* (2006.01)
*B60W 40/04* (2006.01)

(52) U.S. Cl.
CPC ......... *G06Q 10/1091* (2013.01); *B60W 40/04* (2013.01); *B60W 50/0097* (2013.01); *B60W 2050/0077* (2013.01); *B60W 2530/14* (2013.01)

(58) Field of Classification Search
CPC .............. B60W 40/09; B60W 2050/0089
USPC .............. 701/33.4, 34.4; 705/16, 32
See application file for complete search history.

(56) References Cited

U.S. PATENT DOCUMENTS

| 2002/0120374 A1* | 8/2002 | Douros ............... G07C 5/0808 701/34.4 |
| 2003/0043045 A1 | 3/2003 | Yasushi et al. |
| 2014/0199662 A1* | 7/2014 | Armitage ............ B60W 40/09 434/65 |
| 2014/0244103 A1* | 8/2014 | Uno ..................... B60W 40/09 701/33.4 |

(Continued)

FOREIGN PATENT DOCUMENTS

| JP | 2007-145225 A | 6/2007 |
| JP | 2010-273155 A | 12/2010 |

(Continued)

OTHER PUBLICATIONS

International Search Report dated Dec. 8, 2016 issued in international patent application No. PCT/US2016/042106.

(Continued)

*Primary Examiner* — Rokib Masud
(74) *Attorney, Agent, or Firm* — Arent Fox LLP

(57) ABSTRACT

Aspects of notification of a predicted driving event include receiving driver log information associated with one or more drivers respectively corresponding to one or more vehicles, and aggregating the driver log information for a predetermined time period. Further, the aspects include extracting derivations from the aggregated driver log information in accordance with one or more derivation rules associated with an event prediction model operable to predict an adverse driving event. Also, the aspects include applying the event prediction model to the derivations to generate an adverse driver event prediction for each of the one or more drivers. Additionally, the aspects include transmitting a notification message including one or more of the adverse driver event predictions.

20 Claims, 6 Drawing Sheets

(56) References Cited

U.S. PATENT DOCUMENTS

2015/0142205 A1\* 5/2015 Harsham .......... B60W 50/0097
701/1

FOREIGN PATENT DOCUMENTS

| WO | WO 2006/000166 A1 | 1/2006 |
| WO | WO 2008/086156 A3 | 7/2008 |

OTHER PUBLICATIONS

European Search Report dated Nov. 14, 2018 issued in corresponding European Patent Application No. 16825117.1.

\* cited by examiner

DRIVER LOG ANALYTICS SYSTEM

BACKGROUND

In recent decades, significant attention has been called to the issue of safety among truck drivers. In particular, the fact that many drivers may drive for long hours, and may thus be at a lowered sense of alertness, has contributed to a number of highway accidents and fatalities. Accordingly, such perception has lead to legislation and regulations that seek to determine how much and how often a truck driver may drive, and dictate the amount and frequency of rest periods. Compliance with such regulations, including maintaining accurate paperwork for record keeping, may be daunting and time consuming.

As a result, systems for tracking, managing and maintaining a fleet of portable assets have been developed that may assist a fleet operator and/or truck driver to accurately maintain driver logs that may identify, for example, time periods when the driver is on-duty and driving, on-duty but not driving, off-duty, and resting/sleeping, referred to herein as driver log information. In some aspects, such systems may further include one or more systems for actively monitoring the location of the portable asset and one or more systems for monitoring the performance of the portable asset. A system for monitoring the location of the portable asset may include a radio transmitter, a global positioning system (GPS) device, a terrestrial-based communication system such as a cellular network, or another type of communication device capable of periodically or continuously reporting its geographic location and other metrics relating to the portable asset to a receiving device. A system for monitoring the performance of the portable asset may include a number of sensors that collect and report vehicle performance data and a user interface for monitoring operator interaction with the portable asset. In one or more examples, the driver log information may be maintained via the system for monitoring the performance of the portable asset.

In some aspects, the system for tracking, managing and maintaining the portable assets may include, but is not limited to, a remote unit referred to as a mobile computing platform (MCP) device located in a cab and/or trailer of a vehicle transporting a portable asset, which communicates with a network management center (NMC) that collects and analyzes information from one or more MCPs in a fleet. An example of an MCP includes, but is not limited to, an MCP 50, an MCP 100, an MCP 110, an MCP 200, and a TT210 sold by Omnitracs, LLC of Dallas, Tex.

However, simply compiling and maintaining driver log information for the purposes of regulation compliance may not provide adequate guidance to the driver(s) and/or fleet operator(s) to identify potential risks.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

The described features of the present disclosure generally relate to one or more improved systems, methods, and/or devices for analyzing the electronic information associated with driving activities (e.g., driver log information) obtained from the one or more MCPs associated with one or more vehicles to identify a likelihood of an adverse driver event (e.g., a preventable accident, a severe accident, a traffic rule violation, an hours-of-service violation, etc.,) and to provide a notification of such a prediction, and optionally to initiate remedial measures to prevent such adverse driver event.

Thus, in accordance with aspects of the present disclosure, a method and system of predicting an adverse driver event based on driver log information is disclosed. In an example, a network entity (e.g., NMC) may periodically receive driver log information associated with one or more drivers respectively corresponding to one or more vehicles. The NMC may aggregate the driver log information for a predetermined time period, and extract derivations from the aggregated driver log information in accordance with one or more derivation rules associated with an event prediction model operable to predict an adverse driving event. Further, the NMC may apply the event prediction model to the derivations to generate an adverse driver event prediction for each of the one or more drivers. Additionally, the NMC may transmit a notification message including one or more of the adverse driver event predictions, such as to a user of the system, a fleet operator, and/or the driver.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

Various aspects are now described with reference to the drawings. In the following description, for purposes of explanation, numerous specific details are set forth in order to provide a thorough understanding of one or more aspects. It should be understood, however, that such aspect(s) may be practiced without these specific details.

As discussed above, various legislations and regulations require a truck driver, for example, to maintain an accurate driver log that identifies how much and how often a truck driver is on-duty and driving. MCP devices located in a cab and/or trailer of a vehicle transporting a portable asset may aid the truck drivers in managing the driver log information. In some examples, the MCP device may offer a user interface to the truck driver to allow the truck driver to enter and/or track the required driver log information to record the driver activity. Additionally or alternatively, the MCP device may automatically measure at least a portion of the driver log information (e.g., on-duty and driving, on-duty but not driving, off-duty, and resting/sleeping, for example, based on an initial driver entered indication and maintaining a timer, and/or based a number of sensors that collect and report vehicle performance data to the MCP. Additionally, the MCP may thereby communicate the collected driver log information to the NMC for further analysis.

Aspects of the present disclosure leverage the collected driver log information to identify drivers that may be at an elevated risk of an adverse driver event (e.g., a preventable accident, a severe accident, a traffic rule violation, an hours-of-service violation, etc.). For example, if the collected driver log information indicates that a specific driver has logged on-duty and driving hours that exceed a predetermined threshold and/or the number of off-duty hours is below a predetermined threshold for a specified time period (e.g., one week), the driver may be at a lower sense of alertness, and thereby at risk of being involved in an adverse driver event. Because fleet operator(s) may manage, for example, hundreds or thousands of vehicles, the presently disclosed system, which automatically alerts the fleet operator(s) of at-risk drivers, may prevent the adverse driver events from coming to fruition, and also may be used to initiate remedial measures.

Figure 1:
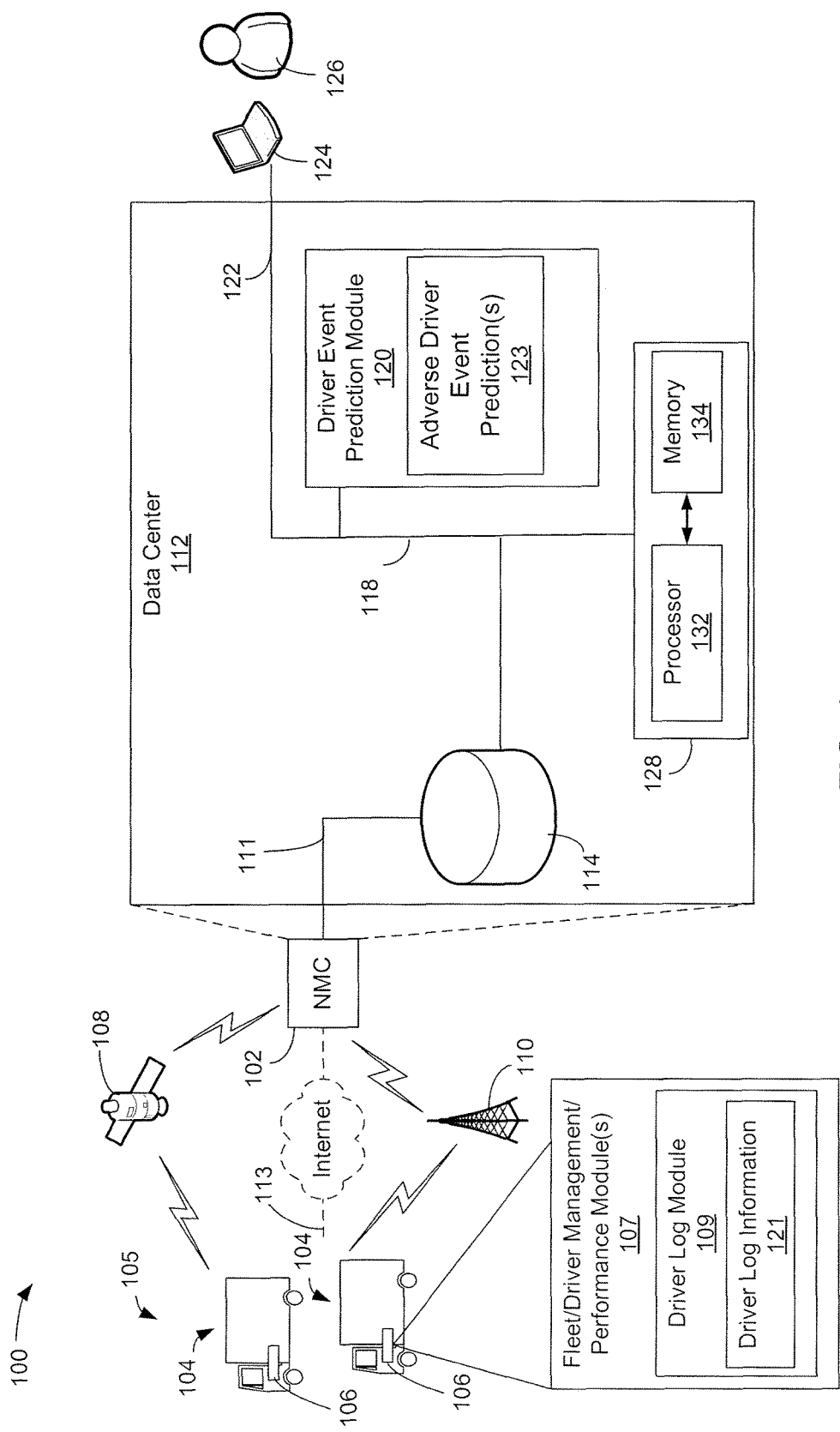
FIG. 1 is a functional block diagram of example elements of an aspect of a system including a driver event prediction module for predicting adverse driver events for one or more drivers of one or more vehicles based on driver log information collected by a respective driver log module of a respective mobile computing platform (MCP) associated with each vehicle or each driver.

Referring to FIG. 1, in an aspect, a system 100 includes modules for collecting, analyzing and presenting fleet and/or driver management or performance data, including a driver event prediction module 120 that can notify a fleet operator or driver of a predicted adverse driver event 123, and initiate remedial measures to avoid such adverse event, based on driver log information 121 received from one or more driver log modules 109 associated with one or more vehicles 104. As used herein, the term "module" may be one of the parts that make up a device, may be hardware or software or firmware, and may be divided into other modules and/or distributed across one or more processors.

In an aspect, system 100 can comprise a network management center (NMC) 102 configured to communicate with one or more vehicles 104 via a mobile computing platform (MCP) 106 located on each vehicle 104 or associated with each driver of each vehicle 104. The system 100 may include one or more fleets of vehicles 104, each fleet having at least one vehicle. Typically, a fleet could include many tens, hundreds or thousands of vehicles. An example fleet 105 is illustrated as having two vehicles 104. Additional fleets (not shown) are contemplated, but not shown. In implementations, each MCP 106 is configured to collect and transmit data associated with the driver and/or the operation of the vehicle 104 to the NMC 102. Also, in some implementations, MCP 106 can be configured to perform calculations associated with one or more fleet and/or driver management or performance module(s) 107 using any of the collected data. In an aspect, fleet and/or driver management or performance module(s) 107 may be implemented as a software application defined by code or instructions stored in a computer-readable medium and executed by a processor, and/or as hardware (e.g., a specially programmed processor module), and/or as firmware. According to the present aspects, one of the fleet and/or driver management or performance module(s) 107 may include driver log module 109, also referred to as an Hours of Service module, which is configured to collect and report driver log information 121 to NMC 102, as will be discussed in more detail below.

In some implementations, MCP 106 may include a processor configured to execute one or more fleet and/or driver management or performance modules 107 one or more transceivers to perform associated communications with external devices such as NMC 102 via a communication network, and a memory configured to store computer-readable code that may define all or part of the modules 107 and also to store data associated with the components 107 and/or MCP 106. MCP 106 may also include a user interface or display, a mobile application server, and a communications module (e.g., including the one or more transceivers, and one or more of terrestrial and Wi-Fi modems, one or more antennae, a GPS module, and a satellite communications module). For example, in an aspect, MCP 106 may include, but is not limited to, an MCP200 platform sold by OMNITRACS LLC of Dallas, Tex., which may include fleet and/or driver management or performance modules 107 such as, but not limited to, a driver log module 109 (also referred to as an Hours of Service module), an Analytics Manager module, a Critical Event Reporting module, a Driver Workflow module, an Extended Productivity Suite module, a Fault Monitoring module, an In-Cab Navigation module, an In-Cab Scanning module, an In-Cab Video Training module, a Media Manager module, a Performance Monitoring module with a Fuel Manager module, a Predictive Performance Service module, a Trip Manager module, a Vehicle Maintenance and Inspection Reporting module, and a Web Browsing module.

As an example only, each vehicle 104 may be in bi-directional communication with NMC 102 over at least one communication channel. In the example shown in FIG. 1, each vehicle 104 is in bi-directional communication with the NMC 102 over at least one of a satellite-based communication system 108 and a terrestrial-based system 110 (e.g., a wireless communication system using a communication protocol/technology such as, but not limited to, GSM, CDMA, TDMA, WCDMA, EDGE, OFDM, GPRS, EV-DO, LTE, WiFi, Bluetooth, or, when the vehicle is stopped, via a wired connection 113 through the Internet). Depending on many factors, data may be exchanged with the vehicles 104 using one or both of the satellite communication system 108 and the terrestrial-based communication system 110.

In an aspect, many different types of data are collected and transferred from the vehicles 104 to the NMC 102. Examples of such data include, but are not limited to, driver performance data, driver duty status such as driver log information 121, truck performance data, critical events, messaging and position data, location delivery data, and many other types of data. As noted, the data associated with the operation of the vehicle 104 may further include driver log information 121 collected by the driver log module 109. In some examples, the driver log module 109 may employ the user interface or display of the MCP 106 to allow a truck driver, for example, to enter relevant driver log information 121 (e.g., on-duty and driving, on-duty but not driving, off-duty, resting/sleeping, etc.) for one or more sampled time points into the MCP 106. For instance, the driver may provide an entry upon a change in driver log information 121 (e.g., a change in a driver state from one to another of on-duty and driving, on-duty but not driving, off-duty, resting/sleeping, etc.), and driver log module 109 may include a timer that maintains a history of how long the driver was in each driver state. For instance, in one example that should not be construed as limiting, each driver state recorded in the driver log information 121 may be represented by a log code (e.g., code having a value of: 1=off duty, 2=sleeping, 3=driving, 4=on duty but not driving), and driver log module 109 may track which log code applies to the driver for each sampled time point, such as, for example, for each minute of the day. As such, in one non-limiting example, driver log module 109 may track the driver log information 121 in a manner that represents the 24 hours in a driver's day as a sequence of 1440 codes, where the sequence corresponds to some combination or sequence of different log code values (e.g., 1=off duty, 2=sleeping, 3=driving, 4=on duty but not driving).

All of the information that is communicated to and from the vehicles 104 is processed via the NMC 102. The NMC 102 can be thought of as a data clearinghouse that receives all data that is transmitted to and received from the vehicles 104. Moreover, in an aspect, NMC 102 may include one or more back-end servers for distributing the software update to one or more MCP(s) 106. Thus, in some aspects, the collected information (e.g., driver log information 121) may periodically (e.g., every x minutes, where x is a whole number, or once a day, or upon availability of a wired or wireless connection) be transmitted from the MCP 106 to the NMC 102 for analysis and record keeping.

The system 100 also includes a data center 112, which may be part of or in communication with NMC 102. The data center 112 illustrates one possible implementation of a central repository for all of the data received from each of the vehicles 104. As an example, as mentioned above many different types of data are transmitted from the vehicles 104 to the NMC 102. In the case where data center 112 is in communication with NMC 102, the data may be transmitted via connection 111 to the data center 112. The connection 111 may comprise any wired or wireless dedicated connection, a broadband connection, or any other communication channel configured to transport the data. Moreover, in an aspect, data center 112 may include one or more back-end servers for distributing the software update to one or more MCP(s) 106.

In an aspect, the data center 112 may include a data warehouse 114 for receiving the data from vehicles 104 relating to fleet and/or driver management or performance. In an aspect, for example, data center 112 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. For example, an application server may include one or more servers related to adverse driver event prediction(s) 123, such as based on receiving driver log information 121 from driver log modules 109 (or, hours of service (HOS) modules). Further, for example, an application server may be a services portal (SP) server that receives, for example, messaging and positioning (M/P) data and/or location delivery efficiency (LDE) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be a fuel cost server that receives, for example, vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 112 may include additional and/or different application servers.

In an aspect, the data center 112 may include an driver event prediction module 120 for analyzing the data in data warehouse 114 from vehicles 104 and generating fleet and/or driver management or performance metrics. According to the present aspects, the data center 112 may include a driver event prediction module 120 to aid in identifying drivers that may be at risk of an adverse event (e.g., a preventable accident, a severe accident, a traffic rule violation, an hours-of-service violation, etc.) based on driver log information 121 collected from driver log module 109.

In some aspect, driver event prediction module 120 may implement a set of routines that define a query to send to data warehouse 114 over connection 118, and that receive data in response to the query from data warehouse 114 over connection 118. The driver event prediction module 120 may capture, manipulate, and provide this data in a usable format, for example, over connection 122 for output on a display or printer associated with a terminal device 124. The terminal device 124 can be a user interface portal, a web-based interface, a personal computer (PC), a laptop, a personal data assistant (PDA), a dedicated terminal, a dumb terminal, or any other device over which a user 126, such as a manager or operator responsible for monitoring a fleet 105 of vehicles 104, can view the display or receive a printed report provided by driver event prediction module 120. According to the present aspects, for example, the driver event prediction module 120 may analyze driver log information 121 and generate a report or notification of one or more at-risk drivers. The user 126 (e.g., fleet operator) may utilize the generated report or notification that identifies the at-risk driver(s) to initiate remedial measures to prevent the predicted adverse driver event 123 from coming to fruition.

In an aspect, driver event prediction module 120 may be an analysis engine defined by or operating via a processing system 128, for example, connected via a system bus 130. In an aspect, the processing system 128 includes a processor 132 and a memory 134. In an example implementation, the functionality of driver event prediction module 120 as described herein may be implemented in one or more hardware or firmware processor modules of processor 132. For instance, although illustrated as being separate components, driver event prediction module 120 and adverse driver event prediction(s) 123 may be a part of or in communication with processor 132. In another example implementation, the memory 134 can store the routines or functionality, e.g., in the form of computer-readable code or instructions, and/or the corresponding data, that are associated with driver event prediction module 120. In an aspect, the processor 132 can execute the stored routines (e.g., code) to implement the functionality of driver event prediction module 120 that are described herein. Although shown as residing within the data center 112, the processing system 128 may reside elsewhere, and may be implemented as a distributed system in which the processor 132 and the memory 134 may include one or more processor and memories, and may be located in different places, such as at NMC 102 and/or one or more servers associated with NMC 102 or data center 112.

It should be noted that the example implementation illustrated in FIG. 1 should not be construed as limiting, as one of skill in the art may modify this implementation and achieve similar results. For instance, rather than the illustrated modules and described functionality for generating predicted adverse driver event 123 operating remotely from MCP 106, e.g., at NMC 102 and/or data center 112, the functionality described herein may instead be implemented directly on MCP 106, which may then directly output adverse driver event prediction(s) 123, e.g., to the driver of vehicle 104 and/or to user 126 (e.g., operator of fleet 105 of vehicles 104) or a manager of system 100, such as a company like OMNITRACS, LLC of Dallas, Tex.

Figure 2:
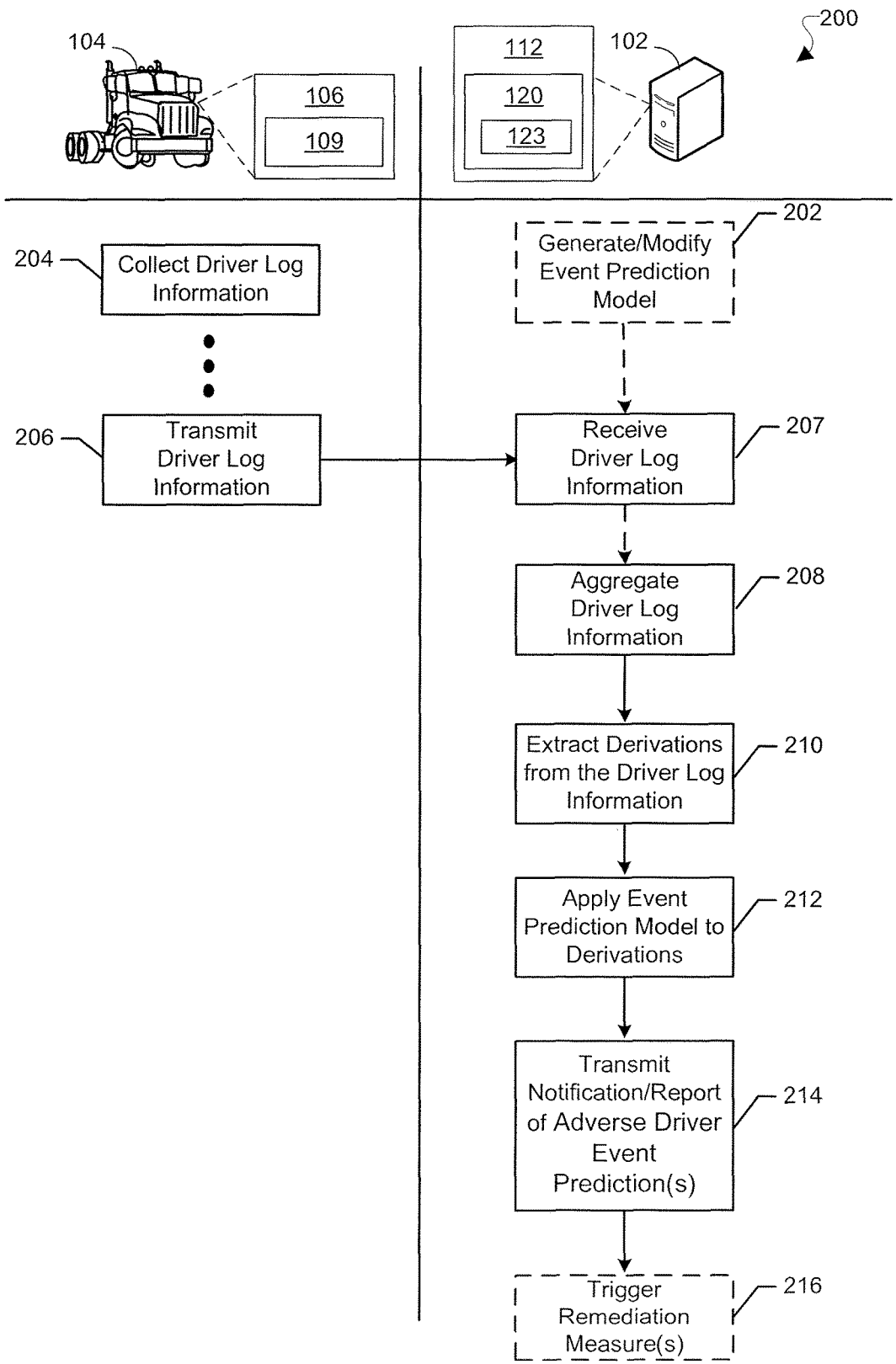
FIG. 2 is a flowchart of an aspect of a method of notification of a predicted driver event in accordance with the present disclosure.
Figure 3:
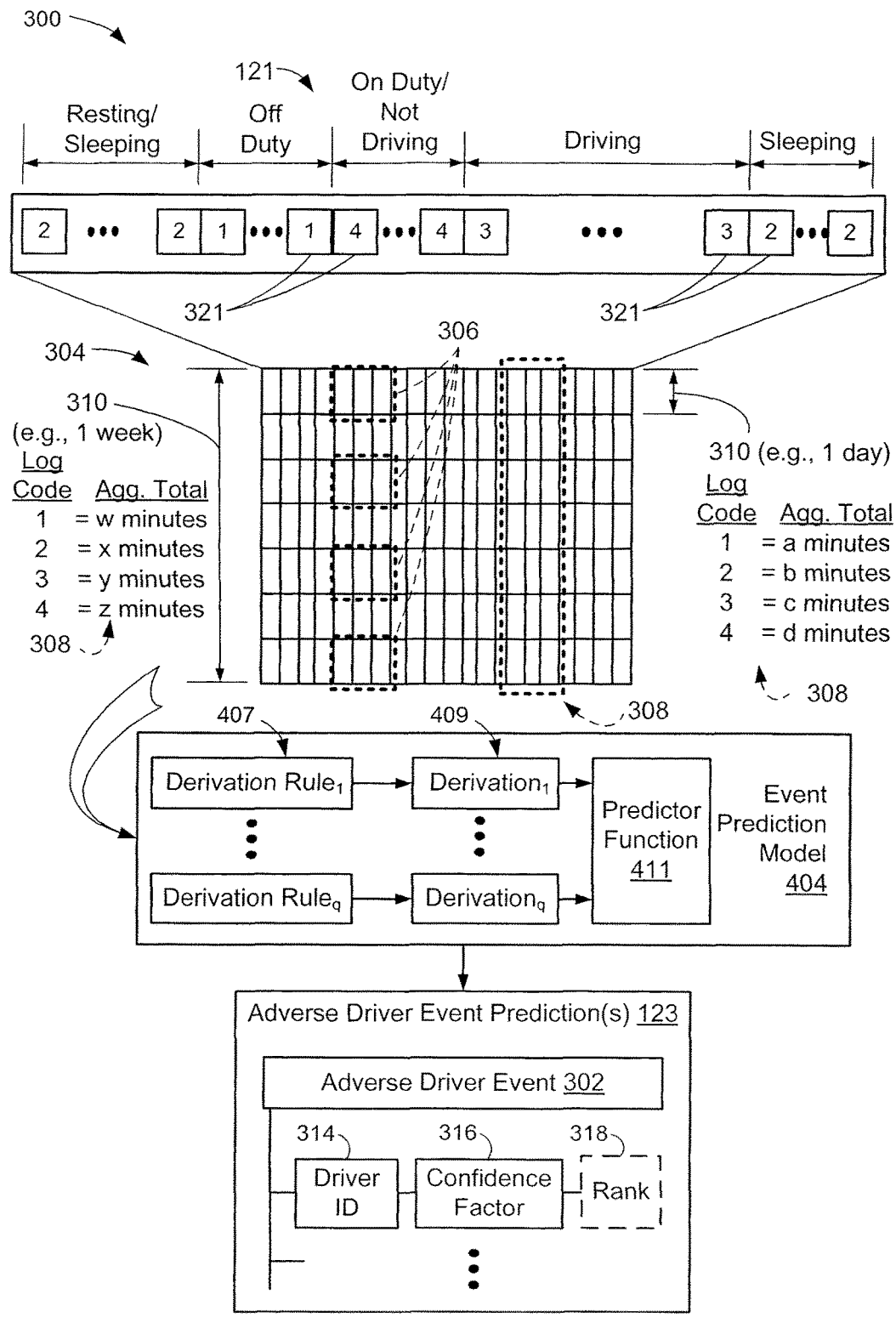
FIG. 3 is a schematic diagram of one example of the collection and aggregation of the driver log information, and the subsequent operation of an event prediction model to determine one or more derivations from the collected and aggregated driver log information, resulting in generation of one or more predicted adverse driver events in accordance with the present disclosure.
Figure 4:
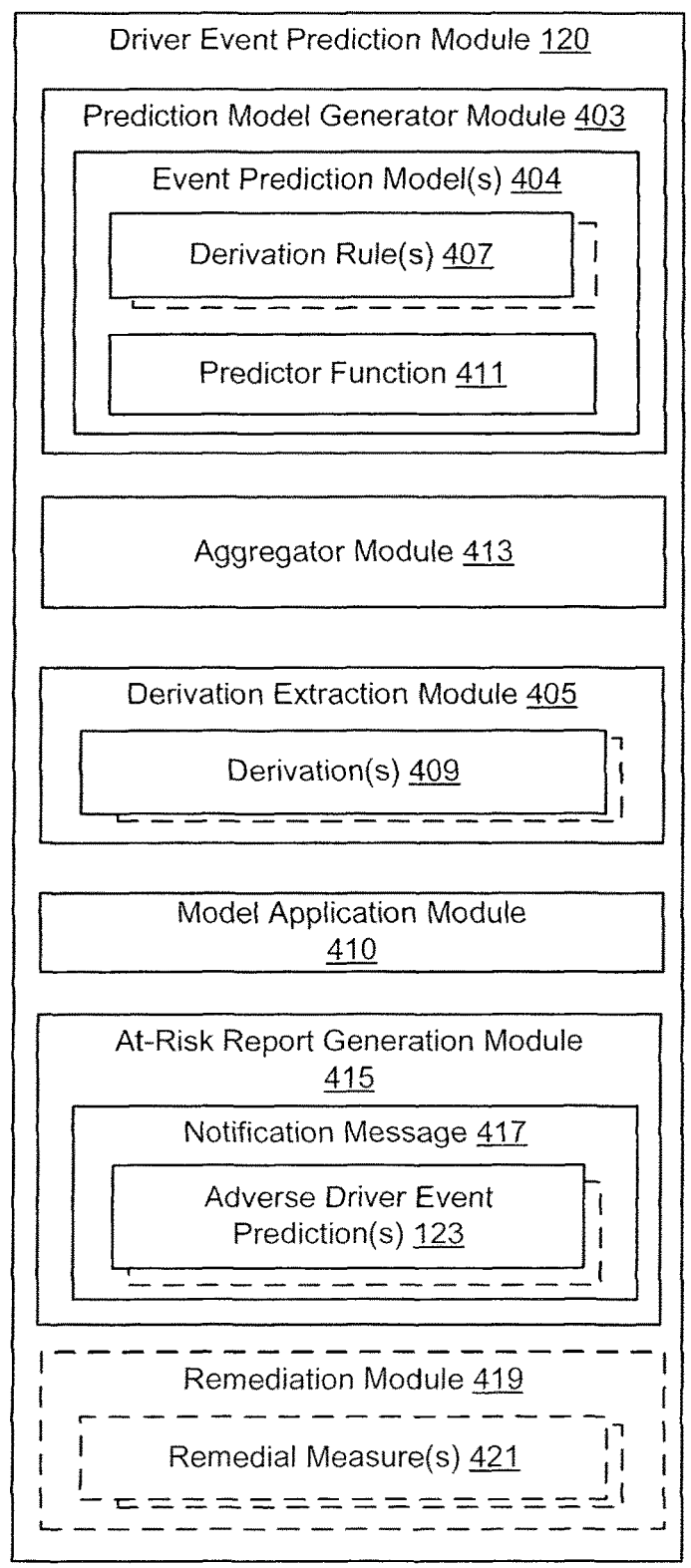
FIG. 4 is a functional block diagram of an aspect of the sub-modules of the driver event prediction module of FIG. 1 in accordance with the present disclosure.

Referring to FIGS. 2-4, an example of one implementation of a method 200 for analyzing driver log information 121 and generating one or more adverse driver event prediction(s) 123 in accordance with the present disclosure includes an interaction between the NMC 102 and at least one designated MCP 106 associated with at least one vehicle 104 and at least one driver. In some aspects, the MCP(s) 106 may include driver log module 109 for collecting driver log information 121. Although the illustrated example shows the interaction between the driver event prediction module 120 and the MCP 106, it should be understood that the driver event prediction module 120 is not limited to receiving the driver log information from the MCP 106 exclusively. As discussed above, and referring for example to FIG. 3, one example of driver log information 121 includes a combination or sequence of log codes 321, where the value of each log code 321 represents a driver state (e.g., log code 321 having a value of: 1=off duty, 2=sleeping, 3=driving, 4=on duty but not driving) for an amount of time associated with each log code 321 (e.g., 1 log code/minute). So, for example, driver log module 109 may track which log code 321 applies to the driver for, for example, each minute of the day. As such, in one non-limiting example, driver log module 109 may track the driver log information 121 in a manner that represents the 24 hours in a driver's day as a sequence of 1440 log codes (60 log codes/minute×1 minute/hour×24 hours/day), where the sequence corresponds to some combination or sequence of different log code values. As mentioned above, the NMC 102 may include or be associated with data center 112. The data center 112, in some examples, may further include driver event prediction module 120, which is configured to generate adverse driver event prediction(s) 123 based on driver log information 121. It should be noted that this example implementation should not be construed as limiting, as one of skill in the art may modify this implementation and achieve similar results. For instance, rather than the illustrated actions of method 200 occurring at NMC 102, the functionality associated with driver event prediction module 120 may instead be implemented on a web portal or directly on MCP 106, which may then directly output adverse driver event prediction(s) 123, e.g., to the driver of vehicle 104 and/or to user 126 (operator of fleet 105). Additionally, method 200 of FIG. 2 is discussed with further reference to FIG. 3, which includes a representation of the collected driver log information 121 and the corresponding processing described herein to arrive at adverse driver event prediction(s) 123, and to FIG. 4, which includes a more detailed architectural implementation of driver event prediction module 120.

In accordance with various aspects of the present disclosure, at 202, method 200 optionally may include generating or modifying an event prediction model. For example, in an aspect that refers to FIG. 3 and FIG. 4, driver event prediction module 120 may include a prediction model generator module 403 configured to generate or modify one or more event prediction models 404 each configured to identify drivers at-risk of experiencing a corresponding adverse driver event 302 based on driver log information 121. Adverse driver event 302, as used herein, may include any predetermined type of driver event that an operator of the present aspects may wish to try to avoid. For instance, examples of adverse driver event 302 include a driver event such as, but not limited to, a preventable accident, or a severe accident, or a traffic rule violation, or an hours-of-service violation, etc. The definition of the different types of adverse driver events 302 may be configurable, and thus may vary from operator to operator. For the sake of example, the following may be suitable definitions of some types of adverse driver events 302: a preventable accident may be considered to be any accident in which a driver may have the ability to avoid an accident (e.g., by maintaining greater distance from vehicle it may be following); a severe accident may be considered to be any accident in which there is damage to vehicle 104 operated by driver or to another vehicle or to some other property; a traffic rule violation may be a violation of a government or operator defined traffic rule; an hours-of-service violation may be a violation of a government or operator defined rule relating to how many hours a driver may drive; and critical events may be considered driving above the speed limit, roll stability control and/or harsh braking. It should be noted that, in some cases, one or more event prediction models 404 may already exist and may not need to be modified or otherwise updated, e.g., based on recent feedback, and as such, the action at 202 of generating or modifying event prediction model 404 may not be implemented. Thus, driver event prediction module 120 and/or prediction model generator module 403 may include at least one event prediction model 404 for each adverse driver event 302 of interest.

In any case, for instance, in an aspect where event prediction model 404 is to be generated or modified, prediction model generation module 403 may generate and/or dynamically adjust the respective event prediction model 404 based on an in-depth analysis of historical data (e.g., historical driver log information, such as the collection of the log codes 321 (e.g., log code value 1, log code value 2, log code value 3, log code value 4) associated with (e.g., for a predetermined time period leading up to) a corresponding historical adverse driver event 302 (e.g., a preventable accident, a severe accident, a traffic rule violation, an hours-of-service violation, critical event, etc.). In particular, the analysis identifies one or more derivation rules 407 for one or more derivations 409, e.g., parameters derived from some subset of the historical driver log information, that are found to have sufficient correlation to contribute to predicting the adverse driver event 302 for a driver. For example, although the generation or modification of event prediction model 404 may initially consider a very high number of derivations 409, e.g., such as over 1000 derivations, based on the historical driver log information associated with the corresponding historical adverse driver event 302, the final event prediction model 404 may only include a fraction of such initially considered derivations. As such, the one or more derivations 409 may also be referred to as predictor variables for the adverse driver event 302. For example, but not limited hereto, prediction model generation module 403 may include or utilize one or more of a regression model, a neural network, a non-linear curve fitting model, correlation coefficients, path analysis, structural equation modeling, principal component analysis, genetic algorithms, analysis of variance, or any other type of predictive modeling to analyze and/or derive event prediction model 404 from historical driver log information for predicting a corresponding historical adverse driver event 302 based on the historical driver log information. As such, a respective event prediction model 404 associated with a respective type of adverse driver event 302 can then be applied to a current set of driver log information 121 to generate one or more adverse driver event prediction(s) 123.

Further, for example, the one or more derivation rules 407 may include a function or equation to be applied to one or more portions of a set 304 of driver log information 121 collected for a predetermined time period 310 in order to define the one or more derivations 409. The set 304 may include collected driver log information 321 over a first predetermined time period (e.g., a week), while the derivation rules 407 may apply to one or more different time periods or subsets within set 304, including to one or more individual subsets 306 of one or more log codes 321 corresponding to selected time periods in set 304, as well as to one or more different aggregated subsets 308 of set 304. For instance, the one or more individual subsets 306 may include, as illustrated but not limited thereto, a subset of log codes 321 from a same time period during one or more different days of a week, and the one or more aggregated subsets 308 may include an aggregation such as a summation of the log codes over a time period (e.g., as illustrated but not limited thereto, a daily summation of log codes 1, 2, 3, and 4, which respectively total a, b, c, and d minutes, or, e.g., a weekly summation of log codes 1, 2, 3, and 4, which respectively total w, x, y, and z minutes, where a, b, c, d, and w, x, y, and z may be whole numbers). Additionally, the function applied as part of each derivation rule 407 may be an identity function, e.g., where the value of log code 321 is recorded, or the function may be any mathematical function, such as an average, mean, sum, standard deviation, comparison or difference, etc. In a simple example of a representative derivation rule 409, a representative derivation 409 or predictor variable may be defined as a sum of the aggregated subset 308 of a number of minutes (or hours) in a day or a week for when a driver is sleeping or driving (e.g., a sum of the aggregated total of log code 2 or log code 3 for one day or one week). In another example, the one or more derivation rules 407 may define one or more derivations 409, or predictor variables, such as a mean or standard deviation of the aggregated subset 308 of a number of minutes (or hours) per week in one month, for whether a driver is sleeping or driving (e.g., a mean or standard deviation of the aggregated total of log code 2 or log code 3 for each week in a month). Other more complicated derivation rules 407 may quantify the occurrence of certain derivations 409 that can be defined by the set 304 of driver log information 321 in certain time periods, or certain combinations of derivations 409 that can be defined in certain time periods, or the absence of certain derivations 409 in a certain time period, or any combination thereof.

In other words, derivations rules 407 may define derivations 409 such as, but not limited to: a 14 hour HOS violation (i.e., number of times in a rolling week a driver may have 14 or more hours of service in a 24 hour period), 11 hour HOS violation (i.e., number of times in a week in which driver had 11 or more hours of service in 14 hour period), 60 hour on-duty violation in 5 days violation (i.e., number of times in a week a driver has more than 60 hours of driving within any 5 day window), excessive time on task violation, etc. In some aspects, the aggregate data table may include over 1,000 various parameters derived by the driver log module 109.

Moreover, as mentioned above, each event prediction model 404 includes a specific set of one or more derivation rules 407 and one or more derivations 409 that are specific to identifying a risk of occurrence of a specific adverse driver event 302 from set 304 of driver log information 121.

For example, for adverse driver event 302 type such as a preventable accident, derivation rules 407 may define derivations 409 that identify, in a certain past time period, indicators that a driver may not be fully alert based on when and for how long the driver is awake, when and for how long the driver is asleep, and when and for how long the driver is driving. For instance, such indicators may include derivations 409 that relate to one or more predictors, such as, but not limited to: whether a driver is driving on a consistent daily schedule; whether a driver is driving for extended time periods; whether a driver is getting sufficient sleep; whether a driver is getting sleep during certain hours of a day; whether a driver has a threshold number of HOS regulation violations in a given time period; and other similar derivations 409.

Further, for example, for adverse driver event 302 type such as a severe accident, derivation rules 407 may define derivations 409 that identify, in a certain past time period, indicators that a driver may not be fully alert based on when and for how long the driver is driving, HOS regulation violations, and whether the driver is on a consistent schedule. For instance, such indicators may include derivations 409 that relate to one or more predictors, such as, but not limited to: whether a driver is on duty but not driving during certain hours of the day, such as during times during normal business hours when you would expect them to be driving, as well as during times outside of normal business hours when you would expect them to be off duty; whether a driver is driving for extended time periods; whether a driver is getting sleep during certain hours of a day; whether a driver has a threshold number of HOS regulation violations in a given time period, and other similar derivations 409.

Also, for example, for adverse driver event 302 type such as a traffic rule violation, derivation rules 407 may define derivations 409 that identify, in a certain past time period, indicators that a driver is in danger of violating a government-based or fleet operator-based traffic rule, such as driving above a speed limit, driving through a red light, conducting illegal U-turns. Further, for example, government-based traffic rules may be issued by a local, state, or federal government, and fleet operator-based traffic rules may include any rules implemented by a fleet operator or other entity to which the driver reports, and which relate to an aspect of driving.

Additionally, for example, for adverse driver event 302 type such as an hours-of-service violation, derivation rules 407 may define derivations 409 that identify, in a certain past time period, indicators that a driver is in danger of violating a government-based or fleet operator-based hours-of-service regulation. For example, in the United States, the Federal Motor Carrier Safety Administration issues Hours of Service Regulations for property-carrying drivers, and for passenger-carrying drivers. These regulations may be found at, for example, 49 Code of Federal Regulations § 395. For example, for property-carrying drivers, the hours-of-service regulations include: 11-Hour Driving Limit (e.g., May drive a maximum of 11 hours after 10 consecutive hours off duty); 14-Hour Limit (May not drive beyond the 14th consecutive hour after coming on duty, following 10 consecutive hours off duty. Off-duty time does not extend the 14-hour period.); Rest Breaks (May drive only if 8 hours or less have passed since end of driver's last off-duty or sleeper berth period of at least 30 minutes. Does not apply to drivers using either of the short-haul exceptions in 395.1(e). (49 CFR 397.5 mandatory "in attendance" time may be included in break if no other duties performed)); 60/70-Hour Limit (May not drive after 60/70 hours on duty in 7/8 consecutive days. A driver may restart a 7/8 consecutive day period after taking 34 or more consecutive hours off duty.); and Sleeper Berth Provision (Drivers using the sleeper berth provision must take at least 8 consecutive hours in the sleeper berth, plus a separate 2 consecutive hours either in the sleeper berth, off duty, or any combination of the two.). Further, for example, fleet operator-based hours-of-service regulations may include any rules implemented by a fleet operator or other entity to which the driver reports, and which relate to an amount of time spent driving or sleeping or some combination of both.

Thus, based on a respective specific set of one or more derivation rules 407 and one or more derivations 409 that are formulated for a specific adverse driver event 302, each event prediction model 404 may be applied to each set 304 of driver log information 121 to determine one or more adverse driving event prediction(s) 123 for a corresponding one or more drivers.

In order to determine the one or more adverse driving event prediction(s) 123, based on the identification and analysis of the one or more derivation rules 407 and derivations 409, the event prediction model 404 may further include a predictor function 411 that may operate to assign variable weight(s) to each of the one or more derivations 409 for use in an equation to generate adverse driving event prediction(s) 123 for one or more drivers. For example, a number of off-duty hours that may identify rest opportunity for a driver may be assigned a higher weight than the on-duty and driving hours. Accordingly, operation of event prediction model 404 using current driver log information 121 collected from one or more MCPs 106 may predict the likelihood of the occurrence of adverse driver event 302 for one or more drivers. In particular, the operation of event prediction model 404 generates one or more adverse driver event prediction(s) 123, which may include, for example, an identification of the type of adverse driver event 302 and a listing of one or more driver identifications (IDs) 314 and optionally a corresponding confidence factor 316, and optionally a rank 318 of the confidence factor relative to other confidence factors. For instance, driver ID 314 may be any type of value that can be used to identify a driver, such as a name, a number, etc. Further, for example, confidence factor 316 may be any type of value that indicates a predicted likelihood of occurrence of adverse driver event 302 based on the inputted driver log information 121 for the given driver. For instance, confidence factor 316 may be a score or a percentage value. Additionally, for example, rank 318 may be another value that indicates a relative order of the values of confidence factor 316, e.g., such as a value starting with "1" for highest likelihood and increasing by "1" (e.g., 2, 3, 4, etc.) for each successive next highest likelihood. Thus, for example, the output of event prediction model 404 may be an ordered listing of drivers ranked from most to least likely to experience adverse driver event 302 in the future based on input of a set of driver log information 121 for that driver.

It should be noted that, in one or more implementations, event prediction model 404 may generate predicted adverse driving event 123 solely based on a set of driver log information 121, and the corresponding derivations 409 based on sampling of and/or aggregations of the driver log information 121, without any additional factors. Accordingly, in these aspects, event prediction model 404 provides a powerful prediction tool based on a relatively simple and limited set of data.

At 204, method 200 may include collecting driver log information corresponding to one or more drivers of one or more vehicles. For example, in an aspect referring back to FIG. 1, driver log module 109 may periodically collect driver log information 121 associated with one or more drivers of one or more vehicles 104. In some aspects, for example, the driver log module 109 may execute code to generate a graphical user interface or other user input interface on a user interface, e.g., a display, of MCP 106, where the graphical user interface may be operable to receive an indication of driver log information 121 via manual inputs by the truck driver or via automatic collection based on the various sensors, or some combination of both. For instance, driver log module 109 may collect the driver log information 121 corresponding to a respective driver (e.g., a driver may log in or may provide an identifier to identify him/her self) once every minute based on a manual input by the truck driver of a current driver state (e.g., a log code, such as a code corresponding to "off duty," "sleeping/resting," "driving," and "on duty but not driving") at the user interface of the MCP 106. Further, in some aspects, driver log module 109 may maintain a clock or timer that tracks a time period associated with a current driver state (e.g., previously received log code) until receiving another manual input from the truck driver to change the current driver state. For example, when a log code corresponding to "off duty" is received, then driver log module 109 can record a log code of "off duty" at that point in time and for every subsequent minute (or other periodic time of interest) until a different driver state is received. In particular, the driver log information 121 associated with the corresponding driver may include, for example, log code 321 having a variable value that indicates the driver state. As mentioned above, one example of the various values and driver states associated with log code 321 may include, but is not limited to, a value of 1 to represent "off duty," a value of 2 to represent "sleeping/resting," a value of 3 to represent "driving," and a value of 4 to represent "on duty but not driving."

At 206, method 200 may include transmitting the collected driver log information to another device for analysis. For example, in an aspect, the MCP 106 and/or driver log module 109 may transmit the driver log information 121 to the NMC 102. In some examples, driver log module 109 may periodically (e.g., every x minutes, where x is a whole number, or once a day, or upon availability of a wired or wireless connection) transmit the driver log information 121 to the NMC 102. For instance, the driver log information 121 may be transmitted from the MCP 106 to the NMC 102 using the communications component 515 (see FIG. 5), e.g., a transceiver or modem, associated with MCP 106 over at least one communication channel (e.g., via satellite-based communication system 108 and a terrestrial-based system 110). Further, for example referring to FIG. 3, the transmitted driver log information 121 may include some sequence of driver log codes 321 for each driver corresponding to a respective vehicle 104, wherein the "sequence" of driver log codes 321 may represent a driver state over some period of time (e.g., which may depend on the frequency of uploading of driver log information 121 by MCP 106 (FIG. 1)). As such, the transmitted driver log information 121 may represent some portion of the set 304 (FIG. 3) of driver log information 121 collected for a predetermined time period 306 (FIG. 3), which may be aggregated into one or more subsets 308 (FIG. 3), to which event prediction model 404 is applied to define the one or more derivations 409. Alternatively, or in addition, in some examples, MCP 106 may perform at least some part of the aggregating of driver log information 121 into one or more subsets 308 (FIG. 3). Accordingly, in such alternative or additional cases, the transmitted driver log information 121 may include a sequence of driver log codes 321 and additionally some aggregated subsets 308 of driver log information 121 as compiled by the driver log module 109 associated with the MCP 106.

At 207, method 200 may include receiving the driver log information associated with one or more drivers respectively corresponding to one or more vehicles. In an aspect, for example, the NMC 102 and/or driver event prediction module 120 may receive the driver log information 121 associated with one or more drivers respectively corresponding to one or more vehicles 104. For instance, referring to FIGS. 1 and 6, driver log information 121 may be received via at least one of a satellite-based communication system 108 (FIG. 1) and a terrestrial-based system 110 (FIG. 1), such as through communications component 615 (FIG. 6), e.g., a transceiver. Moreover, for instance, the received driver log information 121 may be further communicated to driver event prediction module 120 via a bus or other communication link (e.g., 111, 118) within NMC 102 or data center 112, and/or between NMC 102 and data center 112. Further, for example referring to FIG. 3, the received driver log information 121 may include some sequence of driver log codes 321 for each driver corresponding to a respective vehicle 104, wherein the "sequence" of driver log codes 321 may represent a driver state over some period of time (e.g., which may depend on the frequency of uploading of driver log information by MCP 106 (FIG. 1)). As such, the received driver log information 121 may represent some portion of the set 304 (FIG. 3) of driver log information 121 collected for a predetermined time period 310 (FIG. 3), which may be aggregated into one or more subsets 308 (FIG. 3) associated with event prediction model 404 to define the one or more derivations 409. Alternatively or in addition, as mentioned above, in some examples, MCP 106 may perform at least some part of aggregating driver log information 121 into one or more subsets 308 (FIG. 3). Accordingly, in such alternative or additional cases, the received driver log information 121 may include a sequence of driver log codes 321 and additionally some aggregated subsets 308 of driver log information 121 as compiled by the driver log module 109 associated with the MCP 106.

At 208, method 200 may include aggregating the driver log information for a predetermined time period. For example, in an aspect that refers to FIGS. 3 and 4, the driver event prediction module 120 may include an aggregator module 413 operable to aggregate driver log information 121 into a set 304 covering a predetermined time period 310, and/or into one or more different aggregated subsets 308 of the set 304 for one or more predetermined time periods 310.

In other words, the "aggregating" performed by aggregator module 413 may be collecting driver log information 121 over predetermined time period 310, or performing some mathematical function on some portion of the set 304, or some combination of both. As such, aggregator module 413 may include one or more mathematical functions for representing a certain combination of data, e.g., based on one or more derivation rules 407 associated with a respective event prediction model 404. As noted above, the one or more aggregated subsets 308 (FIG. 3) may correspond to some function of some data over different time periods or on certain days or weeks (e.g., a sum, average, mean, standard deviation of minutes or hours per log code 321 over a day or a week or a month, or from day-to-day or week-to-week, etc., or a certain function of a certain log code on one or more days within a certain time period), and/or to some portion of some equation including individual or aggregated data as defined by one or more derivation rules 407. In FIG. 3, in an example that should not be construed as limiting, different subsets 308 are illustrated that correspond to aggregated data over a day, or over a week, or within certain hours of each day of a week, or within certain hours of certain days of a week. It should be understood that the different combinations in which driver log information 121 may be aggregated from one or more portions of set 304 into one or more different aggregated subsets 308 is completely configurable depending on which combination of data one may believe to be of interest with respect to predicting a respective adverse driver event 302.

At 210, method 200 may include extracting derivations from the aggregated driver log information in accordance with one or more derivation rules associated with an event prediction model operable to predict an adverse driving event. For example, in an aspect that refers to FIGS. 3 and 4, the driver event prediction module 120 may include a derivation extraction module 405 to extract derivations 409 from the set 304 of driver log information 121, and/or from one or more different aggregated subsets 308 of the set 304, in accordance with one or more derivation rules 407 associated with a respective event prediction model 404 configured to predict a respective adverse driving event 302. As such, for instance, derivation extraction module 405 may include a function operable to perform the one or more derivations rules 407 on individual portions or on aggregated subsets 308 of the set 304 of collected driver log information 121. For example, in an aspect, the driver event prediction module 120 may process the driver log information 121 by transforming the raw data (e.g., number of hours for on-duty and driving, on-duty but not driving, off-duty, and/or resting hours) into one or more driver evaluation derivations 409, which may be referred to as predictor variables that provide a clearer picture of driver performance of an overall driver state. For example, based on the number of hours for on-duty and driving, on-duty but not driving, off-duty, and/or resting hours, the drive log module 109 may generate derivations 409 such as whether the driver has one or more "14 hour HOS violations" (i.e., number of times in a rolling week a driver may have 14 or more hours of service in a 24 hour period), "11 hour HOS violations" (i.e., number of times in a week in which driver had 11 or more hours of service in 14 hour period), "60 hour on-duty violation in 5 days violations" (i.e., number of times in a week a driver has more than 60 hours of driving within any 5 day window), excessive time on task violations, etc. Based on the derivations 409, the driver event prediction module 120 may identify one or more drivers that may be at risk of being involved in an adverse event (e.g., severe accident). In other examples, the derivations 409 may include a number of hours that one of the one or more drivers rests in a time period during a week, a number of times that the driver violates rules or regulations, a number of times that the driver had sufficient hours of rest during the week, and a number of times that the driver did not have at least ten hours off duty in any day in the week. Yet even further, event prediction model 404 of the driver event prediction module 120 may determine, for example, number of late shift starts, number of early shift starts, total number of late night driving hours, etc., based on the transformation of the raw collected data, e.g., driver log information 121, from the driver log module 109. In some aspects, the raw collected information, e.g., the set 304 of driver log information 121, may produce over 1,000 various derivations 409 to measure driver performance, however, during the generation process, event prediction model 404 will select certain derivations 409, e.g., corresponding to predictor variables, for use in generating adverse driver event prediction(s) 123 for one or more drivers based on the set 304 of collected driver log information 121. In an example, for instance, extracting derivations 409 from the set 304 of driver log information 121 may include extracting selected derivations 409, e.g., predictor variables (e.g., 15 key variables from 1,000 variables) based on the above-noted historical analysis used to formulate event prediction model 404 for the adverse driver event 302. As such, derivation extraction module 405 associated with driver event prediction module 120 extracts derivations 409 from the set 304 of driver log information 121, and/or from one or more different aggregated subsets 308 of the set 304, in accordance with one or more derivation rules 407 associated with a respective event prediction model 404.

At 212, method 200 may include applying the event prediction model to the derivations to generate an adverse driver event prediction for each of the one or more drivers, wherein each adverse driver event prediction includes a confidence factor that indicates a likelihood of whether each of the one or more drivers will experience the adverse driving event in a subsequent time period. For example, in an aspect, driver event prediction module 120 and/or model application module 410 may be configured to apply the event prediction model 404 (e.g., event prediction model 404 generated in block 202) to the extracted derivations 409 in order to generate one or more adverse driver event prediction(s) 123. For example, in an aspect that refers to FIG. 3, the one or more adverse driver event prediction(s) 123 relate to adverse driver event 302, which corresponds to the respective event prediction model 404. Further, the one or more adverse driver event prediction(s) 123 include a driver identification (ID) 314 that identifies a particular driver and a confidence factor 316 that indicates a likelihood of whether adverse driver event 302 will occur in a subsequent time period for the respective driver. Alternatively, or in addition, the one or more adverse driver event prediction(s) 123 may further include a rank 318, which is a value that can be used to indicate the order of confidence factor 316 for the respective driver relative to other confidence factors 316 of other drivers that may be included in a list drivers identified by the one or more adverse driver event prediction(s) 123. For example, in an aspect, adverse driver event 302 may include, but is not limited to, a preventable accident, a traffic rule violation, and an hours-of-service violation, and event prediction model 404 is specifically constructed to be able to predict the particular type of adverse driver event 302. As an example, predictor function 411 of event prediction model 404 may assign variable weight(s) to each of the one or more derivations 409 for use in an equation to generate adverse driving event prediction(s) 123 for one or more drivers. In an alternative or additional example, to generate the one or more adverse driver event prediction(s) 123, event prediction model 404 may operate predictor function 411 to compare the derivations 409 associated with driver log information 121 from one or more drivers against corresponding derivation thresholds (e.g., established based on the historical driver log information associated with the respective historical adverse driver event) to determine how to weigh each derivation 409, or whether or not to consider each derivation 409 when making the prediction. As such, predictor function 411 determines confidence factor 316 associated with each driver to predict the risk of the adverse driver event 302 happening in the future based on the set 304 of driver log information 121 collected corresponding to each driver. For example, if a number of off-duty hours for one or more drivers falls below a predetermined threshold, predictor function 411 of event prediction model 404 may determine that the driver is susceptible to a lowered sense of alertness, and thus confidence factor 316, e.g., the likelihood of adverse driver event 302 occurring, may be increased.

At 214, method 200 may further include transmitting a notification message including one or more of the adverse event predictions. For example, in an aspect that refers to FIG. 4, driver event prediction module 120 and/or at-risk report generation module 415 may be configured to generate and transmit a notification message 417 that includes the one or more adverse driver event prediction(s) 123, and in particular, the list of one or more driver IDs 314. For instance, in one example, based on the likelihood of adverse driver event 302 occurring as reflected in the value of confidence factor 316, driver event prediction module 120 and/or at-risk report generation module 415 may generate a report including a listing of a subset of driver IDs 314, and, optionally, the corresponding confidence factor 3316 and, also optionally, the corresponding rank 318, for use by the user 126 (e.g., fleet operator), where the report may be included in notification message 417. In other words, for example, notification message 417 may include a report of all drivers (e.g., driver IDs 314) and their adverse driver event prediction 123, or some subset of the full list of drivers (e.g., driver IDs 314), such as only those ones having a value of confidence factor 316 considered to be sufficiently high to warrant notification and/or remedial action (e.g., a value of confidence factor 316 that is at or above a warning threshold). As such, in some examples, generating a report to alert the user 126 of at-risk driver may include ranking the one or more drivers in accordance with their likelihood of being involved in an adverse event. In some examples, the one or more drivers may be identified in the report by either a unique identification (e.g., employee identification number) or by name. The one or more drivers may be ranked in ascending or descending order.

Optionally, at 216, method 200 may further include triggering remedial measures to actively reduce risk factors that contribute to the likelihood of the adverse driver event prediction coming to fruition. For example, in an aspect that refers to FIG. 4, driver event prediction module 120 optionally may include a remediation module 419 configured to trigger one or more remedial measures 421. For instance, based on the identification of the at-risk drivers as indicated by adverse driver event prediction(s) 123 and/or notification message 417, remediation module 419 may automatically trigger or may initiate triggering, e.g., by user 126 (e.g., the fleet operator(s)) and/or the driver(s), one or more remedial measures 421 to prevent the adverse driver event 302 from occurring. For instance, the one or more remedial measures 421 may include, but are not limited to, one or more actions such as adjusting a driver work schedule, adjusting one or more driving habits (e.g., such as by remotely re-configuring a vehicle operational parameter (e.g., an allowable maximum speed, an allowable maximum torque, a parameter associated with a collision warning system, such as a safe following distance or a distance to an object at which braking is automatically triggered, of vehicle 104 being driven by the driver), or generating a warning message for driver(s).

Figure 5:
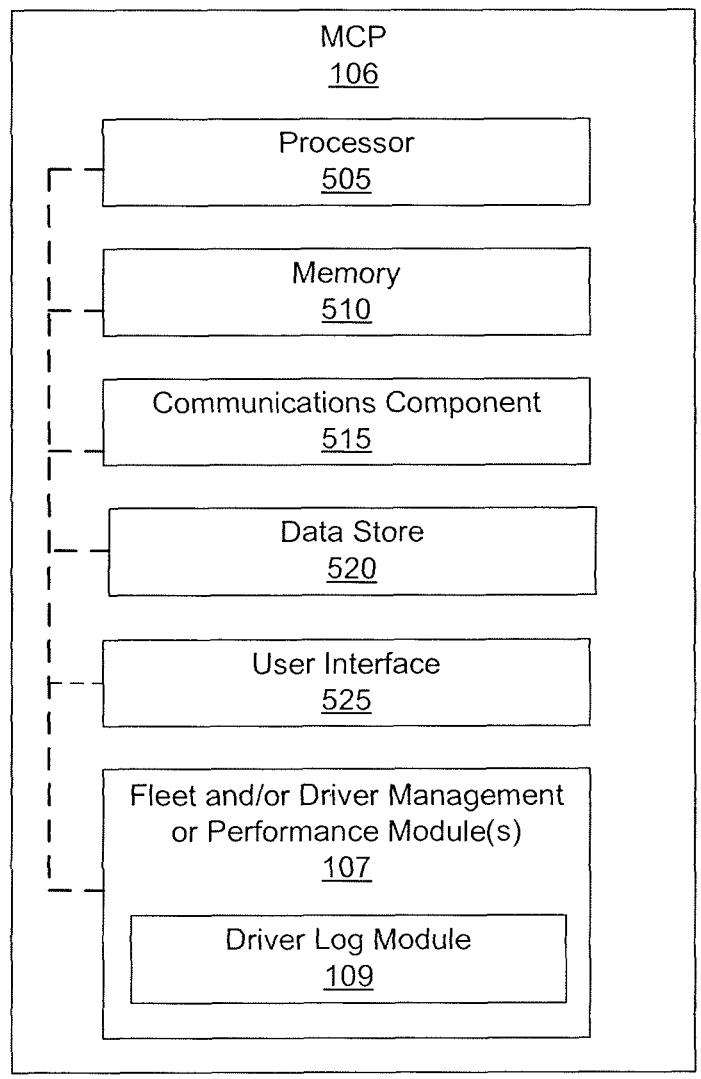
FIG. 5 is a block diagram of an example of an aspect of a mobile computing platform (MCP) in accordance with the present disclosure.

Referring to FIG. 5, in an example that should not be construed as limiting, MCP 106 may include additional components that operate in conjunction with driver management and/or performance module(s) 107 and driver log module 109, which may be implemented in specially programmed computer readable instructions or code, firmware, hardware, or some combination thereof.

In an aspect, for example as represented by the dashed lines, features described herein with respect to the functions of driver log module 109 may be implemented in or executed using one or any combination of processor 505, memory 510, communications module 515, and data store 520. For example, driver management or performance module(s) 107 and driver log module 109 may be defined or otherwise programmed as one or more processor modules of processor 505. Further, for example, driver management or performance module(s) 107 and driver log module 109 may be defined as a computer-readable medium (e.g., a non-transitory computer-readable medium) stored in memory 510 and/or data store 520 and executed by processor 505. Moreover, for example, inputs and outputs relating to operations of driver management or performance module(s) 107 and driver log module 109 may be provided or supported by communications module 515, which may provide a bus between the modules of computer device or an interface for communication with external devices or modules.

Processor 505 can include a single or multiple set of processors or multi-core processors. Moreover, processor 505 can be implemented as an integrated processing system and/or a distributed processing system.

Memory 510 may operate to allow storing and retrieval of data used herein and/or local versions of applications and/or software and/or instructions or code being executed by processor 505, such as to perform the respective functions of driver log module 109 described herein. Memory 510 can include any type of memory usable by a computer, such as random access memory (RAM), read only memory (ROM), tapes, magnetic discs, optical discs, volatile memory, non-volatile memory, and any combination thereof.

Communications module 515 is operable to establish and maintain communications with one or more internal components/modules or external devices utilizing hardware, software, and services as described herein. Communications component 515 may carry communications between modules on MCP 106, as well as between user and external devices, such as devices located across a communications network and/or devices serially or locally connected to MCP 106. For example, communications component 515 may include one or more buses, and may further include transmit chain modules and receive chain modules associated with a transmitter and receiver, respectively, or a transceiver, operable for interfacing with external devices.

Additionally, data store 520, which can be any suitable combination of hardware and/or software, which provides for mass storage of information, databases, and programs employed in connection with aspects described herein. For example, data store 520 may be a data repository for applications not currently being executed by processor 505.

MCP 106 may additionally include a user interface module 525 operable to receive inputs from a user, and further operable to generate outputs for presentation to the user. User interface module 525 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 525 may include one or more output devices, including but not limited to a display, a speaker, a haptic feedback mechanism, a printer, any other mechanism capable of presenting an output to a user, or any combination thereof.

Figure 6:
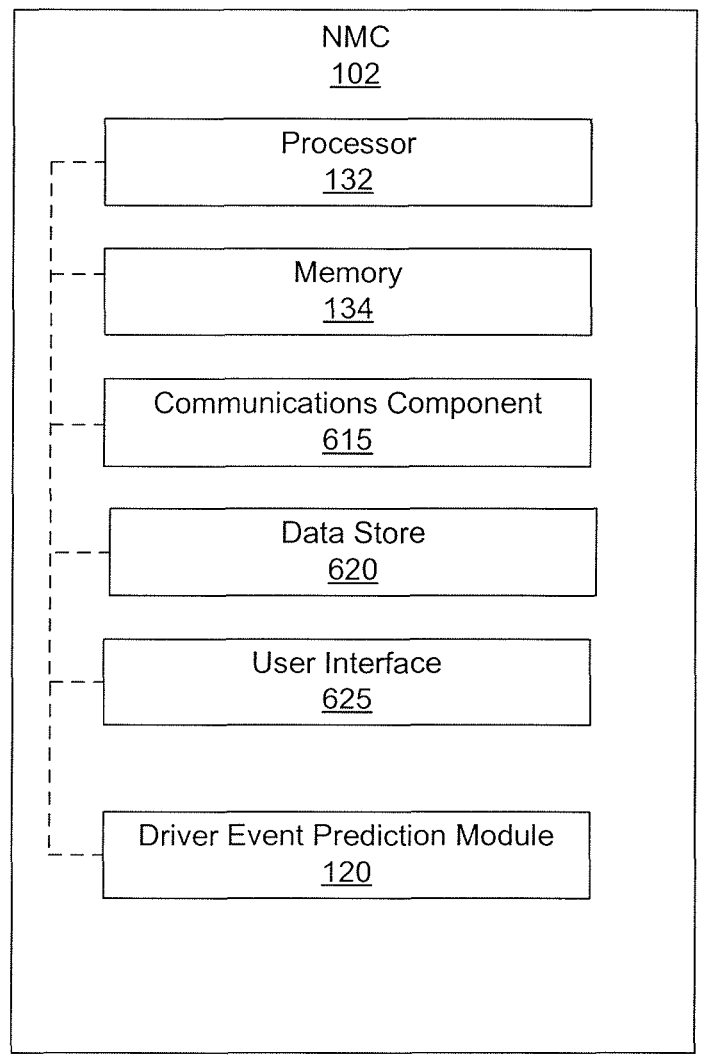
FIG. 6 is a block diagram of an example of an aspect of a network management center (NMC) in accordance with the present disclosure.

Referring to FIG. 6, in an example that should not be construed as limiting, NMC 102 may include additional components for providing driver log analytics and in particular for operating in conjunction with driver event prediction module 120, which may be implemented in specially programmed computer readable instructions or code, firmware, hardware, or some combination thereof.

In an aspect, for example as represented by the dashed lines, the features of driver event prediction module 120 described herein may be implemented in or executed using one or any combination of processor 132, memory 134, communications component 615, and data store 620. For example, driver event prediction module 120 may be defined or otherwise programmed as one or more processor modules of processor 132. Further, for example, driver event prediction module 120 may be defined as a computer-readable medium (e.g., a non-transitory computer-readable medium) stored in memory 134 and/or data store 610 and executed by processor 132.

Processor 132 can include a single or multiple set of processors or multi-core processors. Moreover, processor 132 can be implemented as an integrated processing system and/or a distributed processing system.

Memory 134 may be operable for storing and retrieving data used herein and/or local versions of applications and/or software and/or instructions or code being executed by processor 132, such as to perform the respective functions of the respective entities described herein. Memory 134 can include any type of memory usable by a computer, such as random access memory (RAM), read only memory (ROM), tapes, magnetic discs, optical discs, volatile memory, non-volatile memory, and any combination thereof.

Communications component 615 may be operable to establish and maintain communications with one or more internal components/modules and/or external devices utilizing hardware, software, and services as described herein. Communications component 615 may carry communications between modules on NMC 102, as well as between user and external devices, such as devices located across a communications network and/or devices serially or locally connected to NMC 102. For example, communications component 615 may include one or more buses, and may further include transmit chain modules and receive chain modules associated with a transmitter and receiver, respectively, or a transceiver, operable for interfacing with external devices.

Additionally, data store 620, which can be any suitable combination of hardware and/or software, which provides for mass storage of information, databases, and programs employed in connection with aspects described herein. For example, data store 620 may be a data repository for applications not currently being executed by processor 132.

NMC 102 may additionally include a user interface module 625 operable to receive inputs from a user, and further operable to generate outputs for presentation to the user. User interface module 625 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 525 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In the above description, the term "software product" may include files having executable content, such as: object code, scripts, byte code, markup language files, and patches. In addition, a "software product" referred to herein, may also include files that are not executable in nature, such as documents that may need to be opened or other data files that need to be accessed.

The term "software update" may also include files having executable content, such as: object code, scripts, byte code, markup language files, and patches. In addition, "software update" referred to herein, may also include files that are not executable in nature, such as documents that may need to be opened or other data files that need to be accessed.

As used in this description, the terms "module," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of notification of a predicted driving event, comprising:
   generating or modifying, by a processor, an event prediction model based on driver log information, from a first predetermined time period, and associated with a corresponding historical adverse driving event;
   receiving, by the processor via a transceiver, driver log information associated with one or more drivers respectively corresponding to one or more vehicles;
   aggregating, by the processor, the driver log information for a second predetermined time period;
   extracting, by the processor, derivations from the aggregated driver log information in accordance with one or more derivation rules associated with the event prediction model operable to predict an adverse driving event;
   applying, by the processor, the event prediction model to the derivations to generate an adverse driver event prediction for each of the one or more drivers; and
   transmitting, by the processor via the transceiver, a notification message including one or more of the adverse driver event predictions,
   wherein the first predetermined time period and the second predetermined time period are different time periods.

2. The method of claim 1, wherein the driver log information includes one or more log codes indicating one or more of:
   whether one of the one or more drivers is driving at a sampled time point,
   whether the driver is on duty but not driving at the sampled time point,
   whether the driver is resting at the sampled time point, and
   whether the driver is off duty at the sampled time point.

3. The method of claim 1, wherein the derivations include:
a first number of hours that one of the one or more drivers rests in a first time period during a week,
a second number of times that the driver violates rules or regulations,
a third number of times that the driver had sufficient hours of rest during the week, and
a fourth number of times that the driver did not have at least ten hours off duty in any day in the week.

4. The method of claim 1, wherein the adverse driver event includes one of a preventable accident, or a severe accident, or a traffic rule violation, or an hours-of-service violation.

5. The method of claim 1, further comprising ranking, by the processor, the one or more drivers in accordance with a value of the confidence factor.

6. The method of claim 1, further comprising triggering, by the processor, a remedial measure for at least one of the one or more drivers based on a value of the confidence factor.

7. The method of claim 1, wherein extracting the derivations further comprises extracting a subset of at least one of the driver log information and aggregated driver log information that indicate that a respective driver is in danger of violating a government-based or fleet operator-based traffic rule.

8. The method of claim 1, wherein extracting the derivations further comprises extracting a subset of at least one of the driver log information and aggregated driver log information that indicate that a respective driver is in danger of violating a government-based or fleet operator-based hours-of-service regulation.

9. The method of claim 1, wherein each adverse driver event prediction includes a confidence factor that indicates a likelihood of whether each of the one or more drivers will experience the adverse driving event in a subsequent time period.

10. A non-transitory computer-readable medium storing code for notification of a predicted driving event, the code comprising instructions executable to:
generate or modify an event prediction model based on driver log information, from a first predetermined time period, and associated with a corresponding historical adverse driving event;
receive driver log information associated with one or more drivers respectively corresponding to one or more vehicles;
aggregate the driver log information for a second predetermined time period;
extract derivations from the aggregated driver log information in accordance with one or more derivation rules associated with the event prediction model operable to predict an adverse driving event;
apply the event prediction model to the derivations to generate an adverse driver event prediction for each of the one or more drivers; and
transmit a notification message including one or more of the adverse driver event predictions,
wherein the first predetermined time period and the second predetermined time period are different.

11. The non-transitory computer-readable medium of claim 10, wherein the adverse driver event includes one of a preventable accident, or a severe accident, or a traffic rule violation, or an hours-of-service violation.

12. An apparatus for notification of a predicted driving event, comprising:
a memory configured to store instructions;
a processor communicatively coupled with the memory, the processor configured to execute the instructions to:
generate or modify an event prediction model based on driver log information, from a first predetermined time period, and associated with a corresponding historical adverse driving event;
receive driver log information associated with one or more drivers respectively corresponding to one or more vehicles;
aggregate the driver log information for a second predetermined time period;
extract derivations from the aggregated driver log information in accordance with one or more derivation rules associated with the event prediction model operable to predict an adverse driving event;
apply the event prediction model to the derivations to generate an adverse driver event prediction for each of the one or more drivers; and
transmit a notification message including one or more of the adverse driver event predictions,
wherein the first predetermined time period and the second predetermined time period are different.

13. The apparatus of claim 12, wherein the driver log information includes one or more log codes indicating one or more of:
whether one of the one or more drivers is driving at a sampled time point,
whether the driver is on duty but not driving at the sampled time point,
whether the driver is resting at the sampled time point, and
whether the driver is off duty at the sampled time point.

14. The apparatus of claim 12, wherein the derivations include:
a first number of hours that one of the one or more drivers rests in a first time period during a week,
a second number of times that the driver violates rules or regulations,
a third number of times that the driver had sufficient hours of rest during the week, and
a fourth number of times that the driver did not have at least ten hours off duty in any day in the week.

15. The apparatus of claim 12, wherein the adverse driver event includes one of a preventable accident, or a severe accident, or a traffic rule violation, or an hours-of-service violation.

16. The apparatus of claim 12, wherein the processor is further configured to execute the instructions to rank the one or more drivers in accordance with a value of the confidence factor.

17. The apparatus of claim 12, wherein the processor is further configured to execute the instructions to trigger a remedial measure for at least one of the one or more drivers based on a value of the confidence factor.

18. The apparatus of claim 12, wherein the extract the derivations further comprises extracting a subset of at least one of the driver log information and aggregated driver log information that indicate that a respective driver is in danger of violating a government-based or fleet operator-based traffic rule.

19. The apparatus of claim 12, wherein the extract the derivations further comprises extracting a subset of at least one of the driver log information and aggregated driver log information that indicate that a respective driver is in danger of violating a government-based or fleet operator-based hours-of-service regulation.

20. The apparatus of claim 12 wherein each adverse driver event prediction includes a confidence factor that indicates a likelihood of whether each of the one or more drivers will experience the adverse driving event in a subsequent time period.

* * * * *